Feb. 15, 1966    P. P. KORN    3,234,717
GAS FILTERING APPARATUS
Filed June 15, 1961
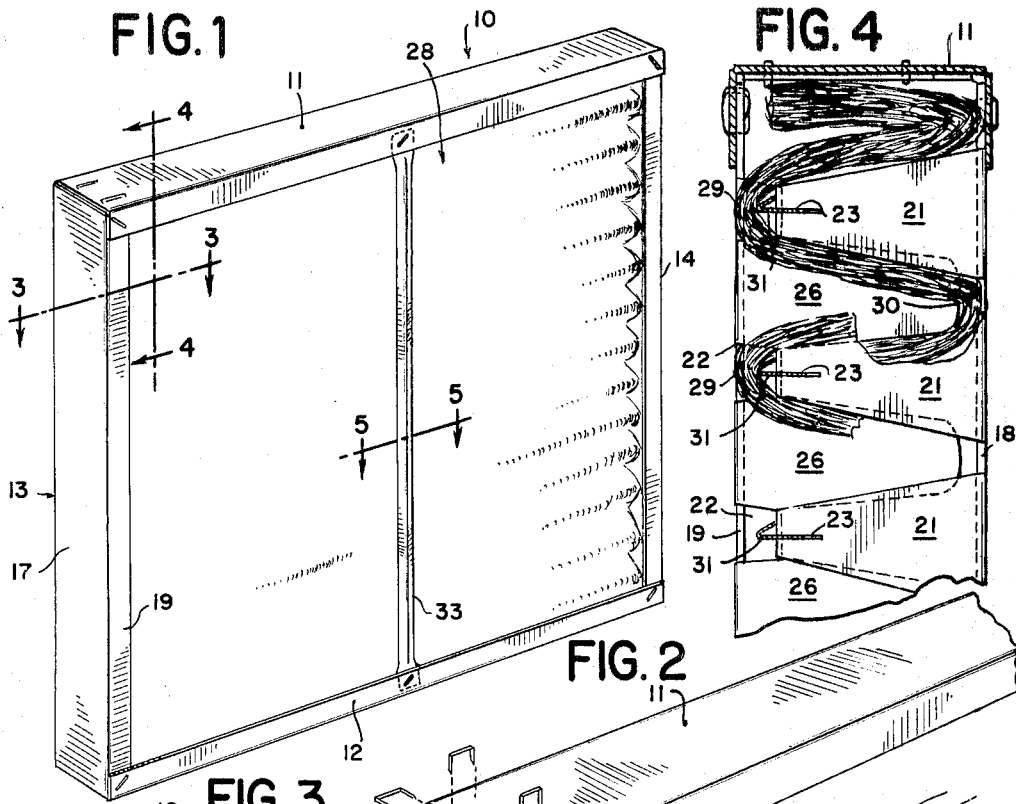
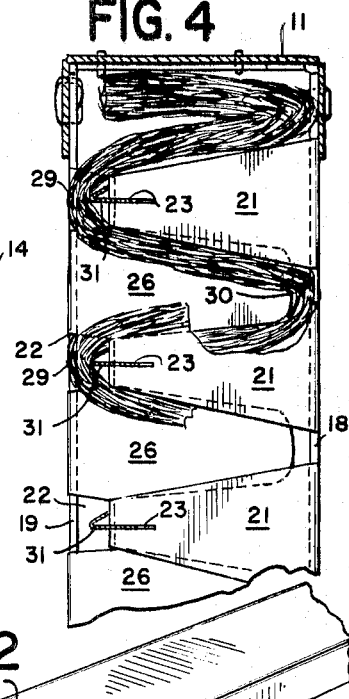
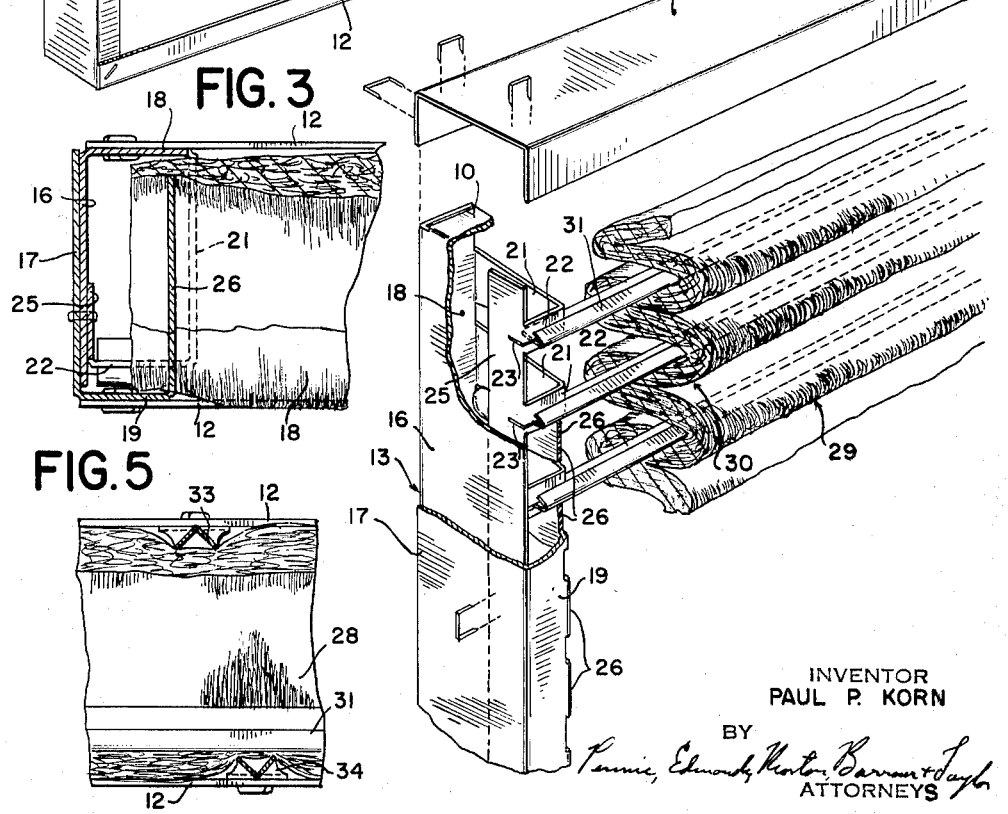
INVENTOR
PAUL P. KORN
BY
ATTORNEYS

United States Patent Office 3,234,717
Patented Feb. 15, 1966

3,234,717
GAS FILTERING APPARATUS
Paul P. Korn, Hartsdale, N.Y., assignor to Arco Manufacturing Corp., a corporation of New York
Filed June 15, 1961, Ser. No. 120,874
2 Claims. (Cl. 55—499)

This application is a continuation-in-part of my copending application of the same title filed October 10, 1960, Ser. No. 61,475, now abandoned.

This invention relates to apparatus for filtering gases flowing through a duct. The new apparatus is characterized in that it includes an improved filter element of fibrous batt and a novel frame adapted to hold the batt tightly in place within the duct in such a manner that it presents a plurality of firmly supported pleats to the gases flowing through the duct.

One of the major features of this apparatus is that the filter element achieves substantially improved separation of suspended articles, such as dust or the like, from gases flowing through the duct. The new filter element is of fibrous batt, i.e., a relatively thick mat of fibers of glass, rayon, cotton, sisal or other fibrous material. Such fibers are not regularly interwoven but rather are randomly entwined and matted together to form a dense flexible mat. Thus, the filter element is thicker than conventional single-layer woven filters and is more efficient in separating suspended particles. In addition, the unwoven uniformly matted construction of the filter element presents a more continuous filtering surface to the flowing gases since it does not possess the grid-like discontinuity of a woven structure.

In order to use this filter element to the best advantage, the invention provides a novel frame assembly which effectively supports and locates the batt material in operating position. The elements of the frame assembly are designed to hold the batt tightly in place within the duct in a manner such that a plurality of firmly supported pleats are formed in the batt. These pleats present a particularly expansive filtering area to the flowing gases and are held in their advantageous shape by the novel frame. Moreover, the structure of the frame member and its associated filter supporting members is such that the apparatus can easily be assembled and dismantled for removal of the filter element. This, of course, is quite important because the filter elements must be replaced after prolonged use.

The apparatus provided by the invention comprises an open frame configured to fit within a duct through which gases flow. The frame rests against the upstream side of a shoulder extending inwardly about the duct. Extending fully across the frame is a filter element of fibrous batt in which are formed a plurality of pleats. Spanning opposed sides of the frame are a plurality of slats which are spaced apart within and support a plurality of the respective pleats on the downstream side of the filter element. Spacing means are also included for holding the slats apart.

In more specific forms of the new apparatus, the frame comprises a plurality of inwardly facing channel members cojoined end-to-end. The spacer element or elements on the downstream side of the filter element may be in positive transverse engagement with each of the slats and may support the valleys of the pleats. At least one retaining strip may also span the sides of the frame to hold the filter element against the slats. A pair of divider strips may be transversely arranged across the respective end portions of the slats adjacent the sides of the frame. Such divider strips and slats are advantageously formed with cooperating locking slots by which they are located in positive transverse engagement.

It is the function of the plurality of slats in this apparatus to support the downstream side of the pleat ridges so that they hold their shape in the flowing air in the duct. The spacer elements contribute to the rigidity of the slats and also support the valleys of the pleated filter element. Consequently, during operation the filter element is held in a stiff frame firmly against the slats and spacer elements by the air flowing through the duct. The exceptional filtering ability of the fibrous batt is thus employed to advantage without in any way sarcrificing the strength and durability of the overall structure.

In one form of the new structure which has proved to be particularly beneficial in achieving the foregoing advantages, the slats are of rigid form and are mounted in and spaced apart by the same elements. Broadly stated, this particular form of the invention comprises an open frame having sides cojoined end-to-end and configured to be mounted securely across the duct. Two opposed sides of this frame each comprise an inwardly facing channel-like body and a plurality of supporting tabs extending across the edges of said channel-like body, each supporting tab being formed with mounting means at one end. The apparatus further includes a filter element comprising a single unwoven mat of fibrous batt extending fully across the frame, and a plurality of pleats defining alternate ridges and valleys across the entire filter element. A plurality of substantially rigid slats are fitted at their opposite ends in the mounting means of opposed supporting tabs and support the ridges of the respective pleats on the downstream side thereof.

A preferred embodiment of the filtering apparatus of the invention is described below with reference to the accompanying drawings, wherein FIG. 1 is a perspective view of the upstream side of the new filter apparatus;

FIG. 2 is an exploded fragmentary section partly broken away of a portion of the apparatus of FIG. 1;

FIG. 3 is a fragmentary section taken along the line 3—3 of FIG. 1;

FIG. 4 is a fragmentary section taken along the line 4—4 of FIG. 1; and

FIG. 5 is a fragmentary section taken along the line 5—5 of FIG. 1.

Referring to the new filter apparatus of FIGS. 1 and 2, particularly as shown in FIG. 1, this apparatus includes an open frame 10 having four sides of paperboard material cojoined end-to-end to form a square. Opposed sides 11 and 12 of the frame 10 are substantially U-shaped one-piece channel members facing inwardly toward the center of the frame, as shown in FIG. 4. These channel members are of single thickness paperboard.

The other two opposed sides 13 and 14 of the frame are of more complex construction. Both of the sides 13 and 14 are of identical construction, and their design can be seen most clearly in FIGS. 2, 3 and 4 where the side 13 is shown in detail. It includes a body strip at the frame edge formed by two overlying plies 16 and 17 appropriately fastened together, as by stapling. First and second flanges 18 and 19 extend integrally from the respective plies 16 and 17 toward the center. The end of the body strip may be closed by means of a turned-over portion 20 of the ply 16, as shown in FIG. 2.

Extending integrally from the edge of the first flange 18 toward the second flange 19 are a plurality of equally spaced supporting tabs 21 disposed throughout the length of the side 13. The tabs 21 are not long enough to extend all the way to the second flange 19, as is apparent in FIG. 3. A plurality of webs 22 extend integrally from the outer ends of the respective supporting tabs 21 away from the frame center and toward the double-ply body strip. Each pair of adjoining webs 22 and supporting tabs 21 is formed with a slot 23 as shown in FIGS. 2 and 4. Extending integrally from web-to-web is an elongated connecting strip 25 which is secured to the inside of the body strip, for example by stapling.

A plurality of equally spaced tucking tabs 26 project integrally from the edge of the second flange 19 toward the first flange 18. These tucking tabs 26 are offset with relation to the supporting tabs 21, as can be seen most clearly in FIG. 4. Also, unlike the supporting tabs 21, the tucking tabs 26 are free at their outer ends.

By this construction, the opposed sides 13 and 14 of the frame are basically channel-like members having a double-ply body or back and single-ply flanges, with supporting tabs extending substantially across the edges of the flanges and tucking tabs projecting from one flange into the spaces between the supporting tabs. Each of the sides 13 and 14 is made up of only two folded paperboard elements. The various cojoined surfaces which are not integrally attached may be stapled together or glued or otherwise fastened. Both sides 13 and 14 are cojoined end-to-end to the other two sides 11 and 12 by staples or other fastening means as shown in FIG. 1.

The filtering apparatus of this invention also includes a filter element 28 comprising a single unwoven quadrilateral mat of fibrous batt extending fully across the frame. A plurality of pleats are formed in this material (which is not self-supporting) to define alternate ridges 29 and valleys 30. Mounted in the slots 23 opposed to one another in the sides 13 and 14 are a respective plurality of metal slats 31 which support the downstream sides of the ridges 29 of the filter element 28. Each of the metal slats 31 is of substantially J-shaped cross section so as to be rigid and self-supporting. The longer leg of this J cross section fits into one of the slots 23 at each end of the slats 31 as seen in FIGS. 2 and 4. These slat ends are held in place by the overlying second flange 19, as shown in FIG. 2. The tucking tabs 26 extending integrally from the second flange 19 project between the slats 31 and down into the valleys 30 of the filter element 28. This holds the slats in place and supports the valleys of the pleats on their upstream side. The final elements in this embodiment of the filter apparatus are a pair of rigid metal retaining strips 33 and 34 (see FIGS. 1 and 5) spanning the sides 11 and 12 of the frame on the upstream side of the apparatus to lend further support to the frame and to hold the pleat ridges in place.

I claim:

1. In a gas filtering apparatus of the type having a rectangular frame defining a rectangular opening therein, a plurality of parallel slats extending from one side to the opposite side of the frame and a pleated fibrous filter element supported by said slats to form a filter screen substantially covering said opening, said filtering apparatus having an upstream side serving as an inlet for the gas entering into said filtering apparatus and a downstream side serving as an outlet for said gas, the improvement in combination therewith comprising a pair of supporting sides for supporting said slats, said supporting sides defining two opposite sides of said frame, each of said supporting sides having:
   (a) first and second flat elements overlapping one another in direct physical contact with one another and joined at at least one point to form a double ply body strip defining a first wall of said supporting side and a portion of the outer periphery of said frame, said first flat element forming one ply of said body strip and having a first integral flange portion extending inwardly toward said opening and defining a second wall of said supporting side at the downstream side of said filtering apparatus and said second flat element forming the second ply of said body strip having an integral second flange portion extending inwardly toward said opening forming a third wall of said supporting sides, said third wall disposed parallel to said second wall and at the upstream side of said filtering apparatus;
   (b) a plurality of supporting tabs being integral parts of said first flat element, said tabs extending from said first flange portion toward said second flange portion and parallel to said double plied body strip, each said tabs having an integral web portion bent substantially parallel to said third wall and spaced apart therefrom, a joining strip integral with said web portion, said joining strip disposed parallel to, direct physical contact with, and secured to said first wall to form a box-like structure;
   (c) means on each of said tabs and web portions thereof for mounting the end of one of said slats; and
   (d) a plurality of tucking tabs integral with said second flange portion, said tucking tabs extending from the second flange portion toward said first flange, substantially parallel to said first wall, said tucking tabs being in offset positions relative to said supporting tabs and extending from the third wall toward the downstream side of said filtering apparatus, said tucking tab being in spaced-apart relation from the body strip.

2. Gas filtering apparatus according to claim 1 wherein the first and second flat elements are cardboard, said means for mounting the end of one of said slats is a slot in each of said supporting tabs and web portions thereof, and each of said tucking tabs associates with one of said supporting tabs and fits into the valley of the pleated filter element on the upstream side thereof thereby locking said filter element onto the frame.

References Cited by the Examiner

UNITED STATES PATENTS

| 930,561 | 8/1909 | Rahe | 55—500 XR |
|---|---|---|---|
| 1,049,789 | 1/1913 | Williamson | 55—500 XR |
| 1,056,108 | 3/1913 | Lunken | 55—500 XR |
| 1,899,007 | 2/1933 | Birkholz | 55—500 |
| 2,058,669 | 10/1936 | Dollinger | 55—521 XR |
| 2,062,649 | 12/1936 | Hegan | 55—493 XR |
| 2,071,806 | 2/1937 | Walker | 55—499 |
| 2,082,481 | 6/1937 | Christofferson | 55—500 |
| 2,138,874 | 12/1938 | Myers. | |
| 2,211,382 | 8/1940 | Nutting | 55—509 XR |
| 2,450,191 | 9/1948 | Feinberg | 55—529 XR |
| 2,588,111 | 3/1952 | Hanneman | 55—497 XR |
| 2,739,667 | 3/1956 | Palmore | 55—499 XR |
| 2,864,460 | 12/1958 | Powers | 55—132 |
| 2,888,092 | 5/1959 | Powers | 55—132 |
| 2,907,408 | 10/1959 | Engle et al. | 55—500 |
| 2,917,130 | 12/1959 | Powers | 55—132 |
| 2,923,376 | 2/1960 | Byrnes | 55—500 XR |
| 2,943,700 | 7/1960 | Bub | 55—521 XR |
| 3,026,967 | 3/1962 | Stevens et al. | 55—500 |

FOREIGN PATENTS

| 562,203 | 6/1944 | Great Britain. |
|---|---|---|
| 781,194 | 8/1957 | Great Britain. |
| 789,256 | 1/1958 | Great Britain. |

HARRY B. THORNTON, *Primary Examiner.*

ROBERT F. BURNETT, *Examiner.*